Nov. 13, 1945.    W. L. MALLMANN ET AL    2,388,753
APPARATUS AND METHOD FOR SANITIZING
Filed Aug. 2, 1939
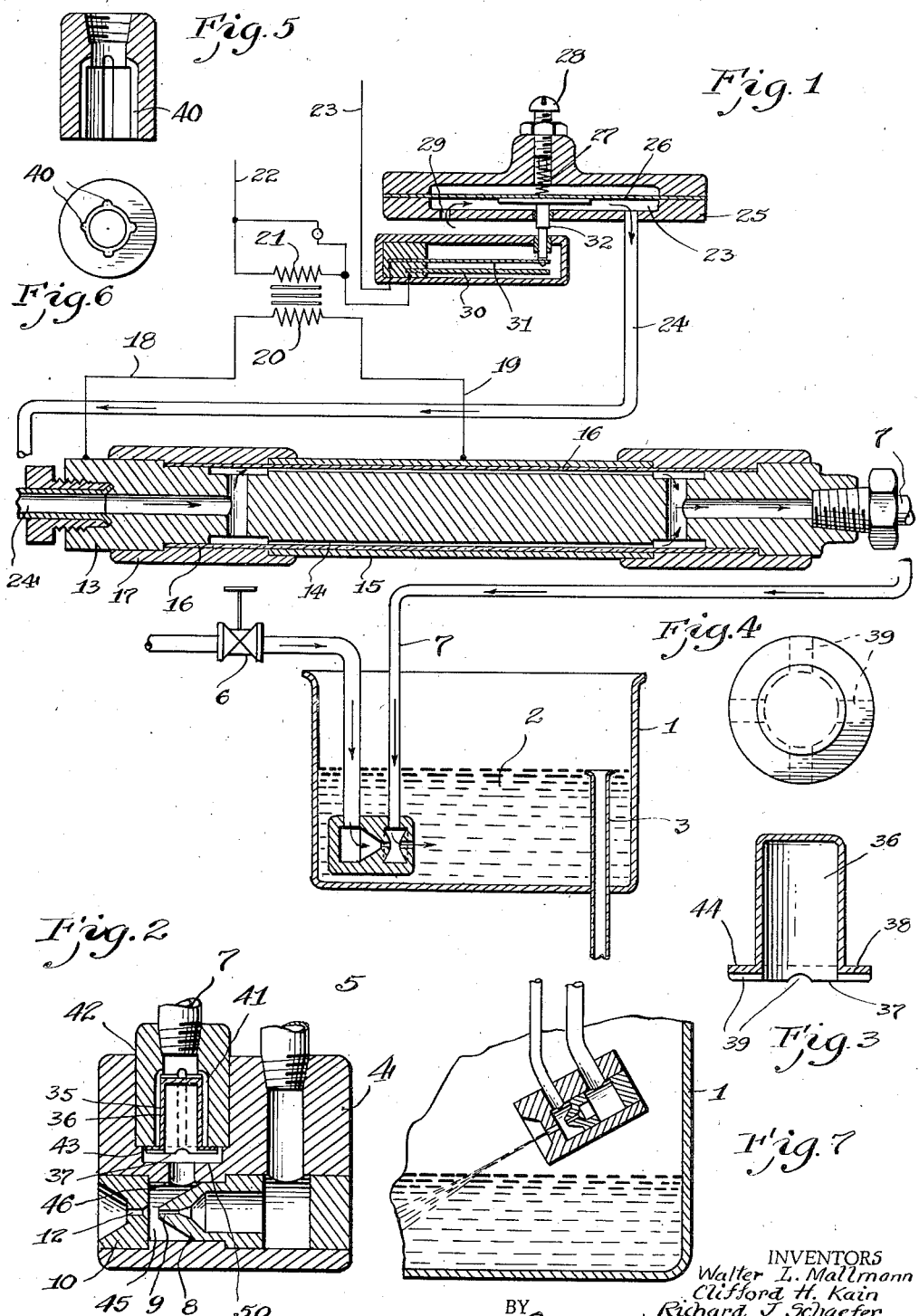
INVENTORS
Walter L. Mallmann
Clifford H. Kain
Richard J. Schaefer
BY
Barnes, Kisselle, Laughlin & Raisch
ATTORNEYS Patented Nov. 13, 1945

2,388,753

UNITED STATES PATENT OFFICE 2,388,753

APPARATUS AND METHOD FOR SANITIZING

Walter L. Mallmann, East Lansing, and Clifford H. Kain and Richard J. Schaefer, Detroit, Mich., assignors to Sanozone Corporation, Detroit, Mich., a corporation of Michigan Application August 2, 1939, Serial No. 288,030

5 Claims. (Cl. 21—58)

This invention relates to an apparatus and method for sanitizing with ozone and other disinfecting gases or liquids.

It is the object of this invention to produce a cheap and reliably effective automatic apparatus and method for sanitizing all types of articles and in particular those articles which are used in the handling and transportation of liquid and solid foods such as cooking, eating and drinking utensils. This object is achieved by subjecting the article to a water solution of ozone of sufficient concentration to effect germicidal action.

The term "sanitized" is used herein to designate the killing of bacteria, particularly harmful bacteria, and is synonymous with the more common meaning of the term sterilized.

This invention also contemplates a novel method and apparatus for effectively and cheaply producing a saturated water solution of ozone.

In the drawing:

Fig. 1 is a layout of the apparatus.

Fig. 2 is a section through the inductor for dissolving the ozone in the water.

Figs. 3 through 6 are detail views of several parts of the inductor.

Fig. 7 is a modified form showing the injector nozzle positioned above the liquid level and inclined to inject the ozonated stream downwardly into the body of water.

This invention contemplates the sterilization of water and of all types of articles through the use of ozone. In the sanitization of articles such, for example, as eating and drinking utensils, it is proposed to bring the bacteria into intimate contact with the water solution of ozone of sufficient concentration to effect a germicidal action. A saturated aqueous solution of ozone is preferred but not necessary. If the article carries a film of soil such as oil, grease, organic matter or other interfering substances upon it, the water solution of ozone cannot reach the bacteria to destroy the same. This, of necessity, requires that the article be rendered free of such deposits prior to sanitization by the water solution of ozone. Further, for the purpose of bringing the article to be sanitized into intimate contact with a water solution of ozone, it is proposed to use a container preferably in the form of tank 1 which is partially filled with a saturated water solution 2 of ozone of sufficient volume and depth to permit complete immersion therein of the article to be sanitized. Since warm water has a very low retention of ozone, it is preferable to operate this apparatus at room temperature or lower, hence a continuous replenished flow of ozonated tap water is desirable. This continuous introduction of ozonated water provides sufficient dilution of the contaminating substances introduced with the articles to be sanitized, so that the elimination of this waste by dilution facilitates the easy maintenance of the saturated ozone solution by the minimum dosage of ozone. The level of the water solution 2 of ozone is maintained by the overflow pipe 3 with which the tank 1 is provided.

It is difficult to obtain a saturated water solution of ozone. However, the instant invention contemplates an apparatus and method by means of which a constantly saturated water solution of ozone can, if desired, be produced and maintained. This is achieved by bringing the ozone into intimate contact with all the water at the time the ozone is being diffused or dispersed into the water. For achieving this result an inductor, shown in section, Fig. 2, is used. This inductor comprises a housing 4 which is connected by pipe 5 to a source of water under pressure. The flow of water through the line 5 is controlled by the hand operated valve 6. The housing 4 is also connected with a source of ozone by the tube 7. The housing 4 is provided with a nozzle 8 having a small outlet orifice 9 through which the water from line 5 under pressure is discharged in a very small stream. The housing 4 is also provided with a nozzle 10 spaced from nozzle 8 to provide a chamber 45. The nozzle 10 is provided with an orifice 12 slightly larger than orifice 9 and axially aligned with orifice 9.

The ozone may be generated in any suitable ozone generating cell. As herein shown, tube 7 is connected with an ozone generating cell comprising an inside electrode 13 in the form of a cylinder, an outside electrode 15 positioned over and spaced as at 14 from the inner electrode 13, and a glass dielectric tube 16 positioned between the inside and outside electrodes. The joint between the inside electrode and the glass and the outside electrode is sealed by suitable insulating material 17. The wires 18 and 19 leading to the secondary winding 20 of a transformer are connected respectively to the inner and outer electrodes. The primary winding 21 of the transformer is connected with electric power lines 22 and 23 leading from a source of current of any suitable voltage such as the ordinary 110 volt domestic electric power line. The transformer preferably steps up the voltage in the secondary to several thousand volts, that is, sufficiently high to generate ozone in the ozone generating cell.

It is desirable to have the ozone generating cell generate ozone only when needed. To this end the air inlet tube 24 is connected to the housing 25 of a vacuum switch actuator. A flexible diaphragm 26 is positioned in the housing 25. The diaphragm 26 is backed up by the compression spring 27, the compression of which is varied by the set screw 28. The inside of the housing 26 is open to atmosphere through opening 29. A switch comprising contacts 30 and 31 is positioned in line 23. The contacts 30 and 31 are normally out of contact. Upper contact 31 is controlled by plunger 32 which is connected to diaphragm 26.

It will be readily seen that when a vacuum is created in suction line 7 by the Venturi action of the water flowing through the inductor 4, a partial vacuum is set up in the chamber 33 below the diaphragm 26. As this partial vacuum is created in chamber 33 the diaphragm 26 is drawn down and the pin 32 in turn makes a contact between terminals 30 and 31 of the momentary contact switch. The momentary contact switch is known as a micrometic switch which has the advantage of making and breaking with a very slight movement of the actuating pin and the break and make is very positive and requires but little pressure on the pin. When contact is made between terminals 30 and 31 the electric circuit is completed through the primary 21 of the transformer and a high potential is created in the secondary 20 of the transformer which is in circuit with the electrodes 13 and 15 of the ozone generating cell. The proximity of these electrodes is such that the silent arcing between them passing through the air chamber or space between the electrodes creates ozone in the air that is being drawn through this chamber by the vacuum set up in the inductor 4.

Therefore when control valve 6 is opened to admit water under pressure through inductor 4, the vacuum set up in tube 7, ozone cell, line 24 and chamber 33 actuates diaphragm 11 completing the primary circuit of the transformer which in turn causes ozone to be generated in the ozone generating cell, which ozone is drawn into the water passing through inductor 4 and discharged into the tank through orifice 12. The ozone discharged into the tank is thoroughly mixed with the water due to the inducting effect by skin friction and expansion of the small diameter stream which is projected from the nozzle through the suction chamber, and as this small stream is further projected into the body of water in the tank, agitation and additional diffusion is obtained by the spray effect set up by the resistance of the tank water.

To prevent water from backing up into the suction line 7 in case the orifice 12 is stopped, an automatic shut off valve is provided. This valve consists of a float 35 which is preferably turned out of aluminum or other light metal. The float 35 is in the nature of a thimble encompassing a chamber 36 open at its lower end as at 37. The lower end of the float is provided with a circumferential flange 38 provided with four radial grooves 39. The inductor is located in the tank 1 in vertical position, as shown in Figs. 1 and 2, so that the float 35 can be positioned vertically as shown in these figures with the flange 38 down and the body portion of the float guided by the serrated wall 40 of the base 41 in member 42. The lower face 43 of the member 42 serves as a seat against which the upper face 44 of the float 36 seats to prevent flowing of water in the line 7.

Since the bottom side of the float is open and at all times filled with air due to the fact that the suction created by the inductor draws all the water from suction line 7 and chamber 45 which surrounds nozzle 8, in the case the outlet orifice 12 is stopped and water pressure is built up in the cavity 45, the water is forced into the ozone inlet 46. However, as water enters ozone inlet 46, the float valve 35 rises and the flange 44 seats against seat 43 thus closing off the serrations 40 and preventing water from flowing into the suction line 7.

In normal operation when the orifice 12 is not stopped the float 35 rests upon seat 50 and the ozonated air passes from line 7 through chamber 36, about valve 35, through radial grooves 39, and thence through outlet 46 into mixing chamber 45.

In a practical working apparatus the ozone-water mixing device was operated under the following conditions: The static city water pressure in the line 5 was 23½ pounds per square inch which is equal to a head of 54 feet. The critical diameter of the orifice 9, which was found to give the best results, was .050 inch. This size orifice gave a good vacuum, and an excellent diffusion of the ozone in the water 2 of the tank. Orifice 12 was .080 inch. The outlet end of orifice 9 was spaced 5/64 of an inch from the inner end of orifice 12. The flow through orifice 9 was .45 gallon per minute. In using this size orifice the reduction in pressure in water line 5 amounted to approximately one pound or .04 of the total pressure. Larger orifices created quite a substantial reduction in the dynamic pressure of the water flowing through line 5. However, the amount of water passing through the orifice 9 remains practically the same over quite a wide range of pressures so that variations in the static water pressure in line 5 is not a critical consideration.

It will be noted that the mixing device 4 is preferably positioned in the water 2 so that the orifices 12 and 9 are beneath the upper surface of the water or just above the surface thereof and in close proximity thereto, so that the discharge flows into the water, thereby creating a spray effect and agitating the tank water, an excellent mixture being obtained as the water and ozonated air is projected with high velocity out of orifice 12. In effect an emulsion of ozonated air and water is created adjacent the orifice 12 and beneath the surface of, and within the body of, water 2. This emulsion changes into a solution. The ozone bubbles created by mixture 4 are so small that they do not lift out of the water 2 but are taken into solution up to the point of saturation. In order to maintain the body of water 2 saturated with ozone preferably the ozonator above described is run continuously so that a fresh supply of intermixed ozone and water is constantly flowing through mixer 4 and orifice 12 into the body of water 2. The overflow passes out of tank 1 through overflow 3. The output of the ozone creating cell is, of course, corelated with the volume of water passing through pipe line 5 and out of orifice 12 so that a saturated water solution of ozone is obtained. The projecting of a small stream of ozone and water at a rapid speed through orifice 12 into the larger body of water 2 is an important factor in getting the ozone into solution in the body of water 2 and preventing the same from rising to the surface of the body of water and thence passing into the air, however, the amount of ozone is purposely produced in excess of the amount required to maintain a saturated solution in the tank, and the excess rises to the surface and permeates the surrounding atmosphere and has the desirable effect of destroying odors such as those produced by stale beer, smoke and food.

Preparatory to sanitizing an article, such as a cooking, eating or drinking utensil, the article is first washed to remove the soil, if any, and then immersed in the saturated water solution of ozone 2 a sufficient length of time to kill the micro-organisms. In numerous tests it has been demonstrated that micro-organisms have been killed at a very rapid rate. Set forth below are protocols of experiments made with the above described sanitizing apparatus. Two cultures were used, namely, *Staphylococcus aureus* and *Escherichia coli*, which are representative types of organisms used for measuring germicidal efficiency. The fact that in these laboratory tests it was possible to kill these organisms in the large numbers tested indicates the effectiveness of this apparatus in actual practice. The actual killing time is equal to, or even less than, that obtained with equivalent amounts of chlorine. In the case of chlorine it is customary to carry a high residual to care for the introduction of soil and micro-organisms over a considerable period of time due to the customary method of intermittent dosing, although the actual amount needed to effect killing is comparable to that for ozone. The continuous introduction of ozone into the body of water 2 makes possible the carrying of a lethal dose which compensates for the lack of a high residual.

Test organism—*Escherichia coli*.
Capacity of tank—12,500 ml.
Rate of flow into tank during test runs—1,000 ml. per second interval.
Number of organisms in tank before adding inoculum—0 per ml.
Number of *Escherichia coli* added at start of test—300,000 per ml.

| Time of exposure in seconds | Number of surviving bacteria per ml., treatment | |
|---|---|---|
| | Ozone plus dilution | Dilution alone |
| Initial | 300,000 | 300,000 |
| 15 | 41,000 | 279,000 |
| 30 | 1,000 | 264,000 |
| 45 | 0 | 251,000 |
| 60 | 0 | 239,000 |
| 90 | 0 | 218,000 |
| 120 | 0 | 200,000 |
| 180 | 0 | 172,000 |

Concentration of ozone: approximately .2 part per million parts of water by weight.

Test organism—*Staphylococcus aureus*.
Capacity of tank—12,500 ml.
Rate of flow into tank during test runs—1,000 ml. per 20 second interval.
Number of organisms in tank before adding inoculum—0 per ml.
Number of *Staphylococcus aureus* added at start of test—320,000 per ml.

| Time of exposure in seconds | Number of organisms surviving per ml. |
|---|---|
| Initial | 320,000 |
| 15 | 11,000 |
| 30 | 700 |
| 45 | 300 |
| 60 | 0 |
| 90 | 0 |
| 120 | 0 |
| 180 | 0 |

Concentration of ozone: approximately .2 part per million parts of water by weight.

We claim:

1. The method of sanitizing an article comprising the steps of immersing the article in a flowing water solution of ozone and continuously adding fresh ozonated water to the solution and continuously withdrawing a portion of the used solution in amounts commensurate with the input of fresh ozonated water.

2. Sanitizing apparatus comprising a tank adapted to receive the article to be sanitized and adapted to receive a water solution of ozone, a source of ozone, a source of water, a mixing nozzle positioned in the tank below the level of the said solution, means connecting the said nozzle with the source of ozone and with the source of water under pressure, the said nozzle having a small orifice opening directly into said tank whereby a small, fast moving stream of water and ozone can be projected directly into the water solution below the level thereof, and means positioned remote from the said nozzle for continuously removing some of the solution from the tank.

3. Sanitizing apparatus whereby an article to be sanitized can be immersed in a water solution of ozone comprising a tank adapted to receive a water solution of ozone, an aspirating nozzle positioned within said tank beneath the solution level, means for connecting said aspirating nozzle with a source of water under pressure, and a source of ozone whereby as the water is projected through and out of the said nozzle the ozone is drawn into the nozzle and then projected with the water directly into the solution in a fine jet whereby the ozone is dissolved in the said water solution, and outlet means for the said tank for removing some of the water solution of the ozone.

4. Sanitizing apparatus whereby an article to be sanitized can be immersed in a water solution of ozone comprising a tank adapted to receive a water solution of ozone, an inductor positioned within the tank below the solution level, said inductor having a passageway therein, a nozzle positioned in said passageway and connected with a source of water under pressure, a nozzle positioned in said passageway and spaced from the first mentioned nozzle, the orifices of the said nozzles being in alignment with each other, the orifice of said second nozzle opening directly into the tank below the solution level, an inlet into the said passageway between the two nozzles, a source of ozone connected to said inlet whereby, as the water flows out of the first nozzle and an aspirating effect is created thereby, the ozone is drawn into said passageway between said nozzles and water and ozone are forced through the said second nozzle directly into the solution in said tank beneath the solution level, and means for maintaining the water solution of ozone within the tank at an approximately constant level.

5. A method for sanitizing articles at room temperature or below comprising the steps of first cleansing the article of soil such as grease, oil, or other organic matter, and then immersing the article in a liquid water solution of ozone at room temperature or below for a period of time sufficient to kill the bacteria or germs carried by the article, and continuously replenishing the water solution of ozone with a water solution of ozone at room temperature or below.

WALTER L. MALLMANN.
CLIFFORD H. KAIN.
RICHARD J. SCHAEFER.